(12) United States Patent
Semnisky et al.

(10) Patent No.: US 11,420,269 B2
(45) Date of Patent: Aug. 23, 2022

(54) CLAMPING ASSEMBLY, A TOOLHOLDER ASSEMBLY COMPRISING A CLAMPING ASSEMBLY AND A TOOLHOLDER, AND A METHOD OF CHANGING A TOOLHOLDER IN A TOOLHOLDER ASSEMBLY

(71) Applicant: Kennametal Inc., Latrobe, PA (US)

(72) Inventors: Logan M Semnisky, Latrobe, PA (US); Alan J Bookheimer, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 369 days.

(21) Appl. No.: 16/567,327

(22) Filed: Sep. 11, 2019

(65) Prior Publication Data

US 2021/0069797 A1   Mar. 11, 2021

(51) Int. Cl.
*B23B 31/26* (2006.01)
*B23B 31/107* (2006.01)
*B23B 29/04* (2006.01)

(52) U.S. Cl.
CPC ........ *B23B 31/1071* (2013.01); *B23B 31/263* (2013.01); *B23B 29/046* (2013.01); *B23B 2231/46* (2013.01); *B23B 2260/03* (2013.01)

(58) Field of Classification Search
CPC ............ B23B 31/1071; B23B 2231/46; B23B 2260/03; B23B 29/046; B23B 2260/034; B23B 31/263; B23B 2231/40; B23B 31/261; B23C 5/26

See application file for complete search history.

(56) References Cited

U.S. PATENT DOCUMENTS

| | | | |
|---|---|---|---|
| 4,747,735 | A | 5/1988 | Erickson |
| 4,932,295 | A | 6/1990 | Erickson |
| 4,951,536 | A | 8/1990 | Robertson |
| 5,054,344 | A | 10/1991 | Erickson |
| 5,173,017 | A | 12/1992 | Oshnock |
| 5,197,720 | A | 3/1993 | Renz |
| 5,245,896 | A | 9/1993 | Erickson |
| 5,415,066 | A | 5/1995 | Erickson |
| 5,452,631 | A | 9/1995 | Erickson |
| 5,697,740 | A | 12/1997 | von Haas |
| 5,775,857 | A | 7/1998 | Johne |
| 6,076,441 | A | 6/2000 | Billington |
| 8,151,673 | B2 | 4/2012 | Erickson |
| 10,118,231 | B2 * | 11/2018 | Bookheimer ........... F16B 19/02 |
| 10,759,061 | B2 * | 9/2020 | Kendrick ................ B25J 9/101 |

(Continued)

FOREIGN PATENT DOCUMENTS

| | | | |
|---|---|---|---|
| DE | 3410154 A1 | 10/1985 | |
| DE | 4117765 A1 * | 12/1992 | ........... B23B 29/046 |

(Continued)

*Primary Examiner* — Eric A. Gates
*Assistant Examiner* — Paul M Janeski
(74) *Attorney, Agent, or Firm* — Christopher J. Owens (57) ABSTRACT

A clamping assembly includes a base member having an internal bore, a lock rod within the internal bore of the base member and moveable in a forward direction and rearward direction between an unlocked position and a locked position, a crank wheel having an axis of rotation, and a linkage coupled to the lock rod and coupled to the crank wheel at a position radially offset from the axis of rotation of the crank wheel.

26 Claims, 14 Drawing Sheets

(56) References Cited

U.S. PATENT DOCUMENTS

2009/0235790 A1    9/2009   Erickson
2011/0067536 A1    3/2011   Erickson
2018/0297124 A1   10/2018   Bookheimer et al.

FOREIGN PATENT DOCUMENTS

DE           19818148  A1      10/1999
WO            1997014525 A2     4/1997
WO       WO-2010060603 A1 *    6/2010  ........... B23B 31/261

* cited by examiner

CLAMPING ASSEMBLY, A TOOLHOLDER ASSEMBLY COMPRISING A CLAMPING ASSEMBLY AND A TOOLHOLDER, AND A METHOD OF CHANGING A TOOLHOLDER IN A TOOLHOLDER ASSEMBLY

FIELD

The present description relates to a clamping assembly, a toolholder assembly comprising a clamping assembly and a removable toolholder, and a method of changing a toolholder in a toolholder assembly.

BACKGROUND

Typically, metal working operations are performed using a cutting insert of a hard carbide, ceramic, or cermet. Such an insert is mounted to a toolholder. Because of the extreme conditions under which they operate, cutting inserts must be replaced on a regular basis. In order to do this, the cutting insert must be removed from the toolholder. The economies of the metalworking operation make it inefficient to shut a machine down for the length of time required to replace a cutting insert on a toolholder. It is more desirable to utilize a clamping assembly with a removable toolholder such that the entire toolholder with the accompanying cutting insert may be removed and replaced with another toolholder having a new cutting insert already in position on the toolholder.

With this in mind, the focus for efficiency then becomes the ease and speed with which the toolholder may be replaced. This has been one of the motivating factors producing different commercial designs for quick change toolholder assemblies.

Accordingly, those skilled in the art continue with research and development in the field of toolholder assemblies.

SUMMARY

In one embodiment, a clamping assembly includes a base member having an internal bore, a lock rod within the internal bore of the base member and moveable between an unlocked position and a locked position, a crank wheel having an axis of rotation, and a linkage coupled to the lock rod and coupled to the crank wheel at a position radially offset from the axis of rotation of the crank wheel.

In another embodiment, a toolholder assembly includes a clamping assembly and a toolholder. The clamping assembly includes a base member having an internal bore, a lock rod within the internal bore of the base member and moveable between an unlocked position and a locked position, a crank wheel having an axis of rotation, and a linkage coupled to the lock rod and coupled to the crank wheel at a position radially offset from the axis of rotation of the crank wheel. The toolholder has a shank configured to be received within the internal bore of the base member.

In yet another embodiment, a method of changing a toolholder in a toolholder assembly includes rotating a crank wheel in a first direction to unclamp a first toolholder from a clamping assembly, removing a first toolholder from the clamping assembly, inserting a second toolholder into the clamping assembly, and rotating the crank wheel in a second direction to clamp the second toolholder into the clamping assembly. The clamping assembly includes a base member having an internal bore, a lock rod within the internal bore of the base member and moveable between an unlocked position and a locked position, the crank wheel having an axis of rotation, and a linkage coupled to the lock rod and coupled to the crank wheel at a position radially offset from the axis of rotation of the crank wheel. The toolholder has a shank configured to be received within the internal bore of the base member.

Other embodiments of the disclosed clamping assembly, toolholder assembly, the method of changing a toolholder in a toolholder assembly will become apparent from the following detailed description, the accompanying drawings and the appended claims.

DETAILED DESCRIPTION

A toolholder assembly of the present description includes a clamping assembly and a toolholder.

The clamping assembly may include a base member having an internal bore, a lock rod within the internal bore of the base member and moveable between an unlocked position and a locked position, a crank wheel having an axis of rotation, and a linkage coupled to the lock rod and coupled to the crank wheel at a position radially offset from the axis of rotation of the crank wheel. By this arrangement, rotation of the crank wheel drives the linear movement of the lock rod between the unlocked position and the locked position.

The linkage may be rotationally coupled to the lock rod by a pin joint. The pin joint may include a pin rotationally coupled within a bearing within one of the linkage and the lock rod. The pin may be rotationally coupled within a bearing within the other of the linkage and the lock rod, or the pin may be fixedly coupled to the other of the linkage and the lock rod.

The linkage may be rotationally coupled to the crank wheel by a pin joint. The pin joint may include a pin rotationally coupled within a bearing within one of the linkage and the crank wheel. The pin may be rotationally coupled within a bearing within the other of the linkage and the crank wheel, or the pin may be fixedly coupled to the other of the linkage and the crank wheel.

The toolholder may have a shank configured to be received within the internal bore of the base member. The toolholder may include a cutting insert.

A method of changing a toolholder in the toolholder assembly of the present description may include rotating the crank wheel in a first direction to unclamp a first toolholder from the clamping assembly, removing the first toolholder from the clamping assembly, inserting a second toolholder into the clamping assembly, and rotating the crank wheel in a second direction to clamp the second toolholder into the clamping assembly.

Figure 1:
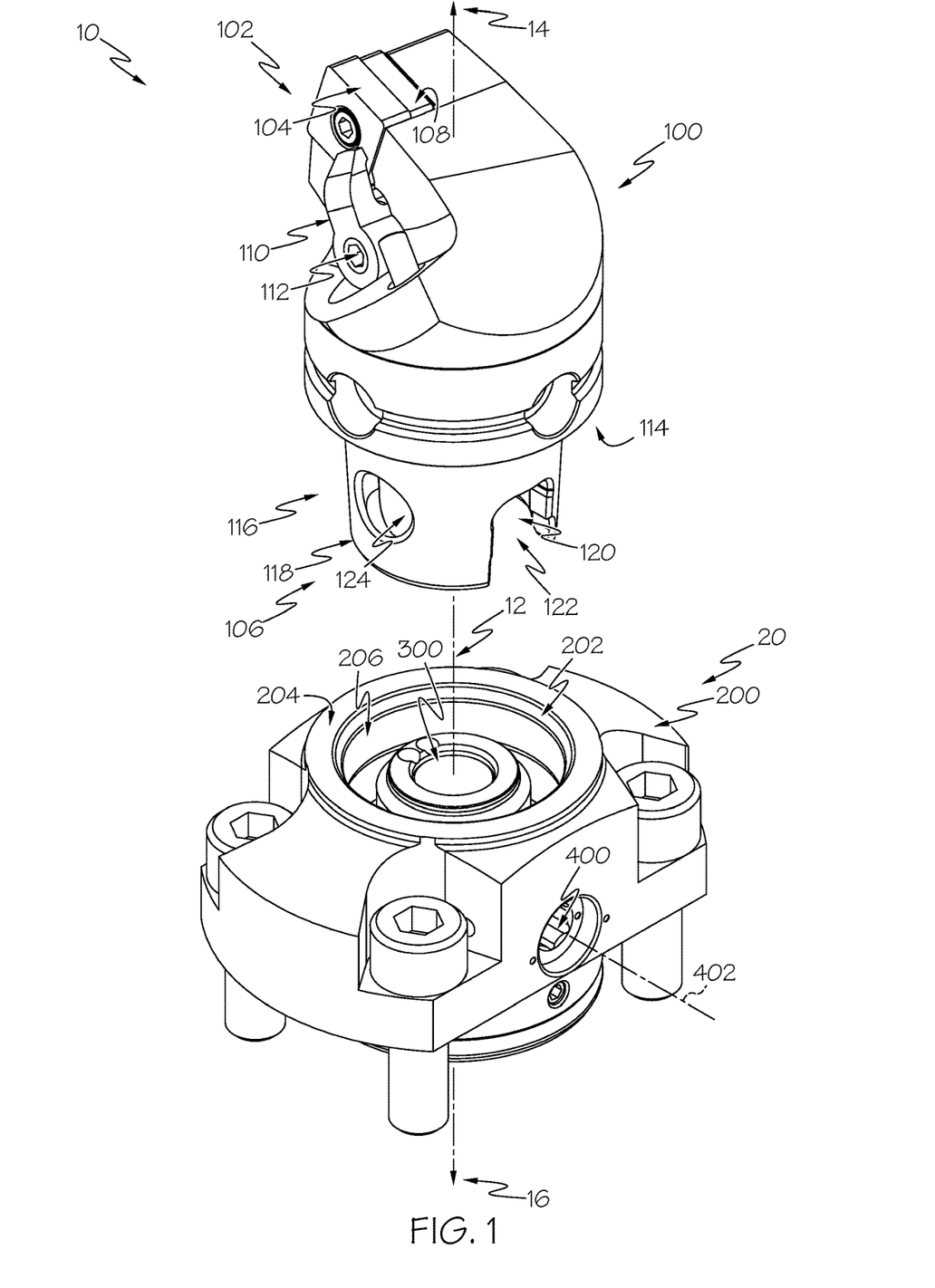
FIG. 1 is a perspective view of an exemplary toolholder assembly according to the present description, the toolholder assembly including a clamping assembly and a toolholder.
Figure 2:
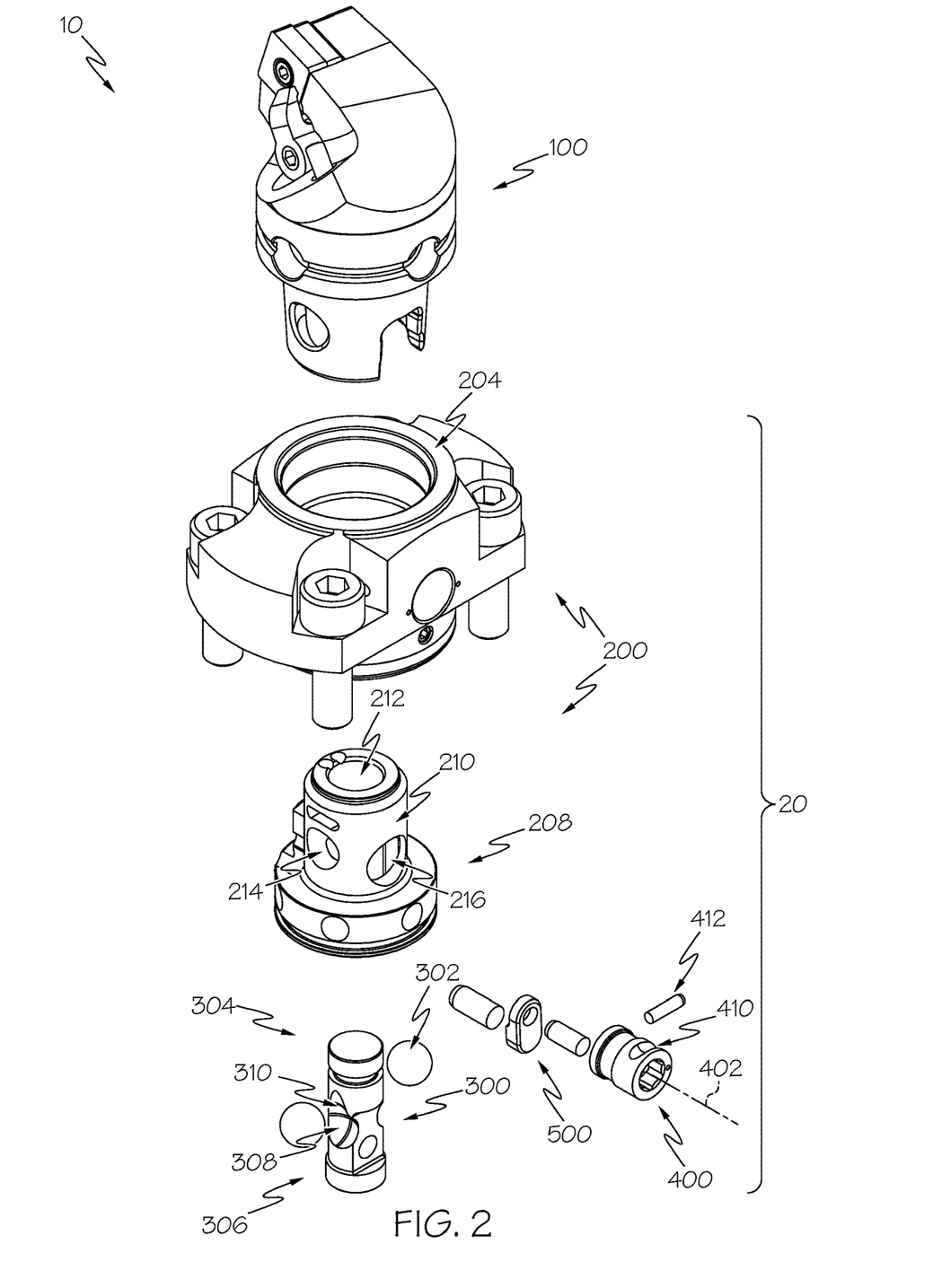
FIG. 2 is an exploded perspective view of the toolholder assembly of FIG. 1, the clamping assembly including a lock rod, a crank wheel, and a linkage.
Figure 3:
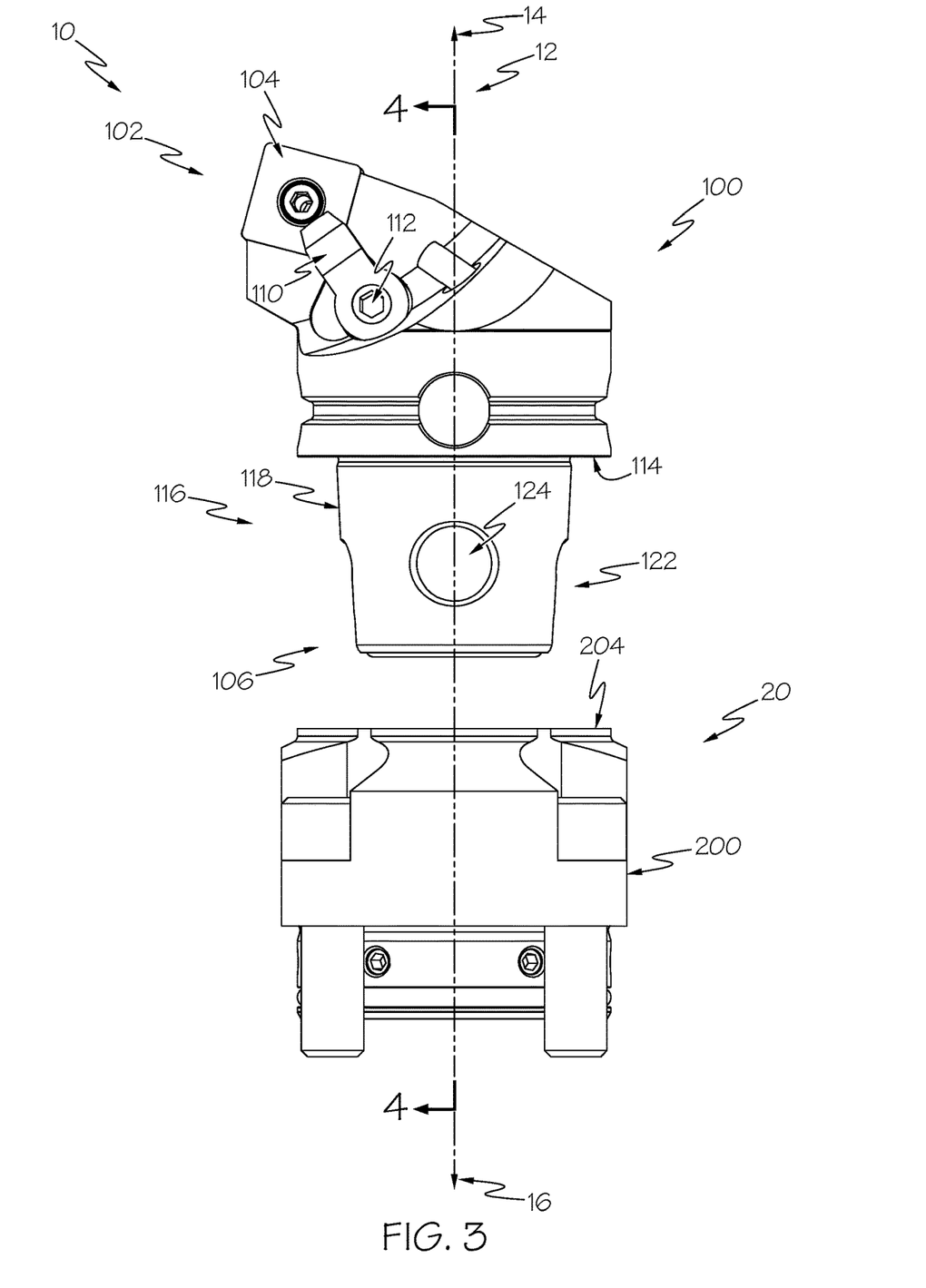
FIG. 3 is a front view of the toolholder assembly of FIG. 1.
Figure 4:
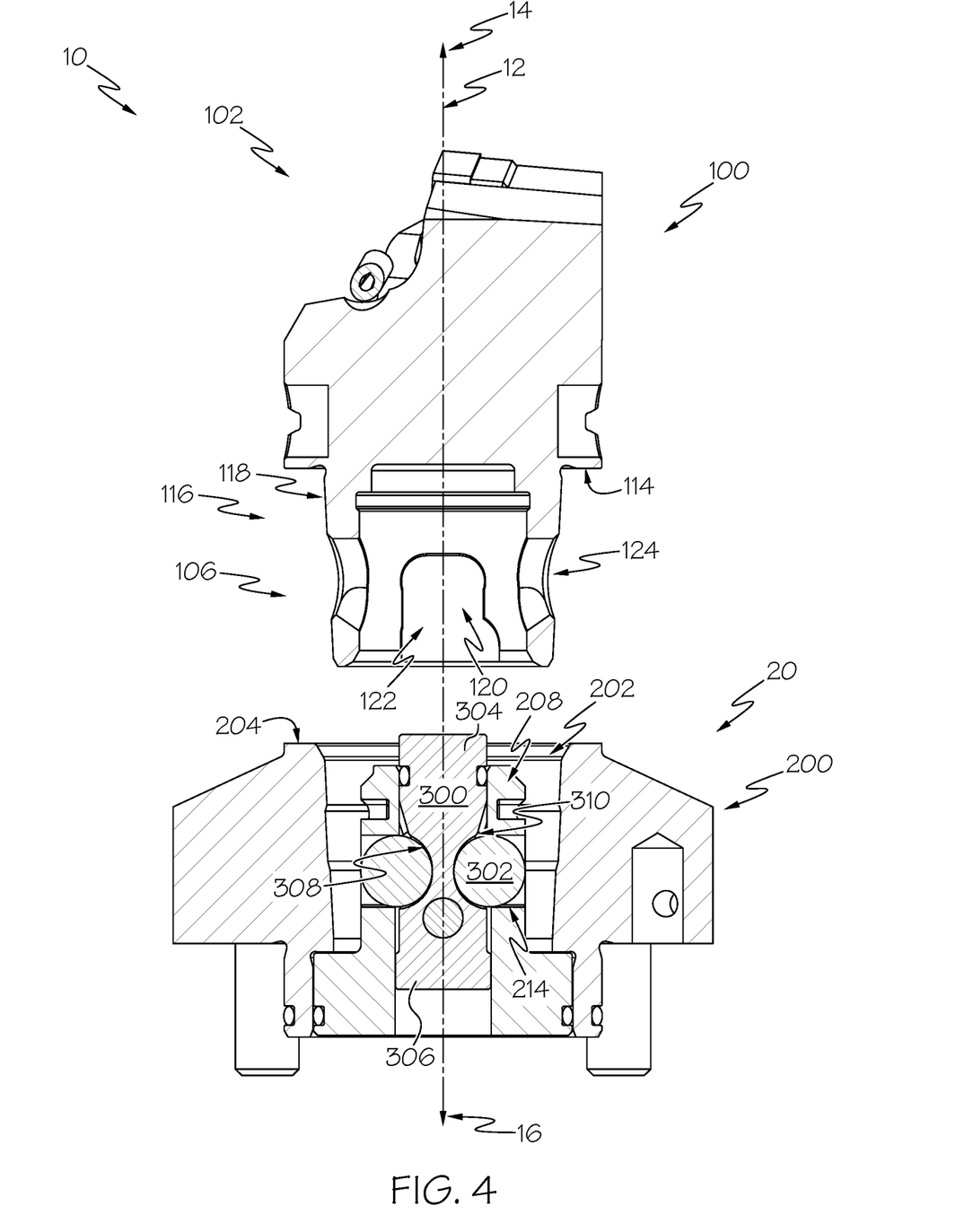
FIG. 4 is a sectional view of the toolholder assembly of FIG. 3 taken along line 4-4
Figure 5:
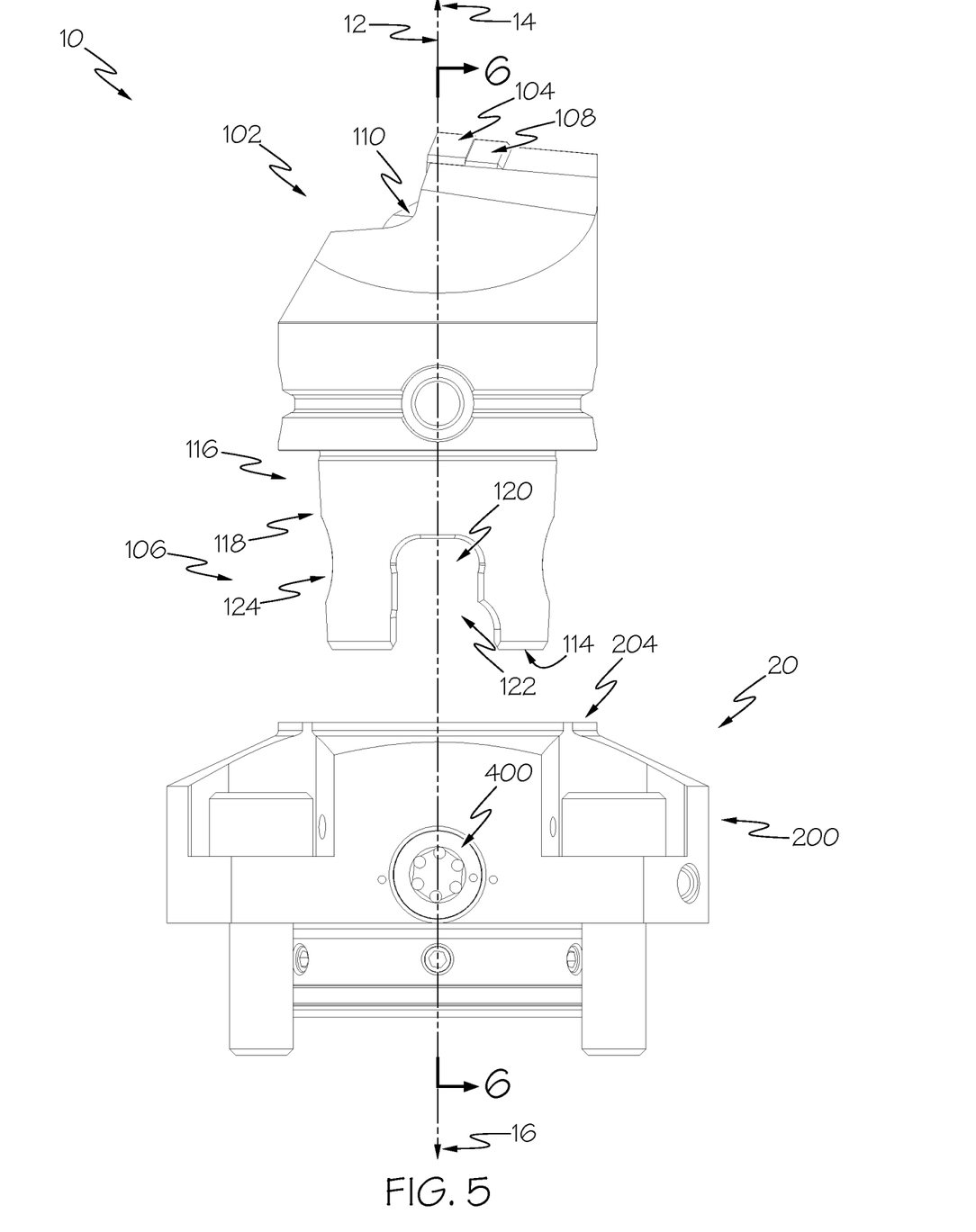
FIG. 5 is a side view of the toolholder assembly of FIG. 1.
Figure 6:
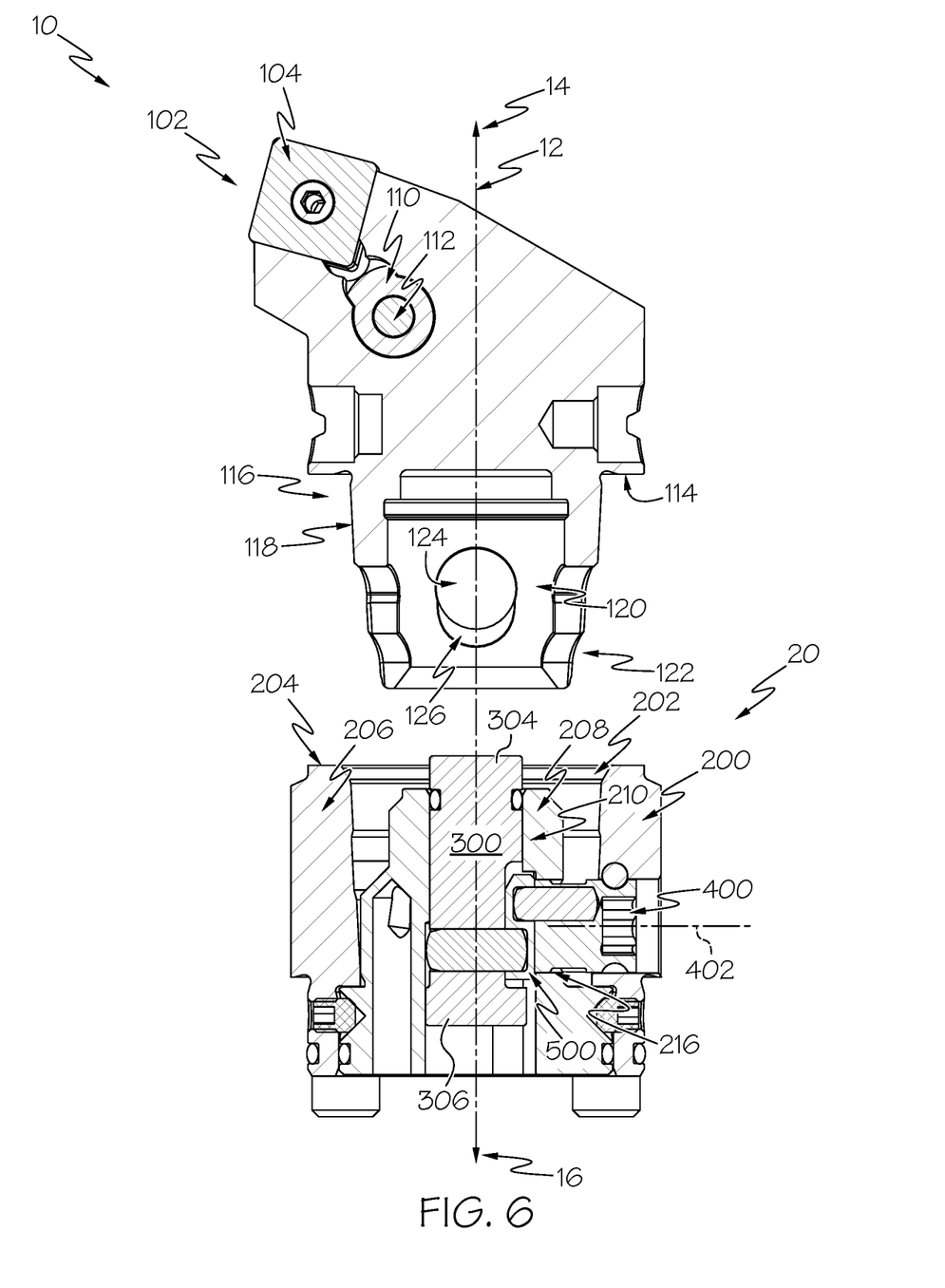
FIG. 6 is a sectional view of the toolholder assembly of FIG. 5 taken along line 6-6.
Figure 7:
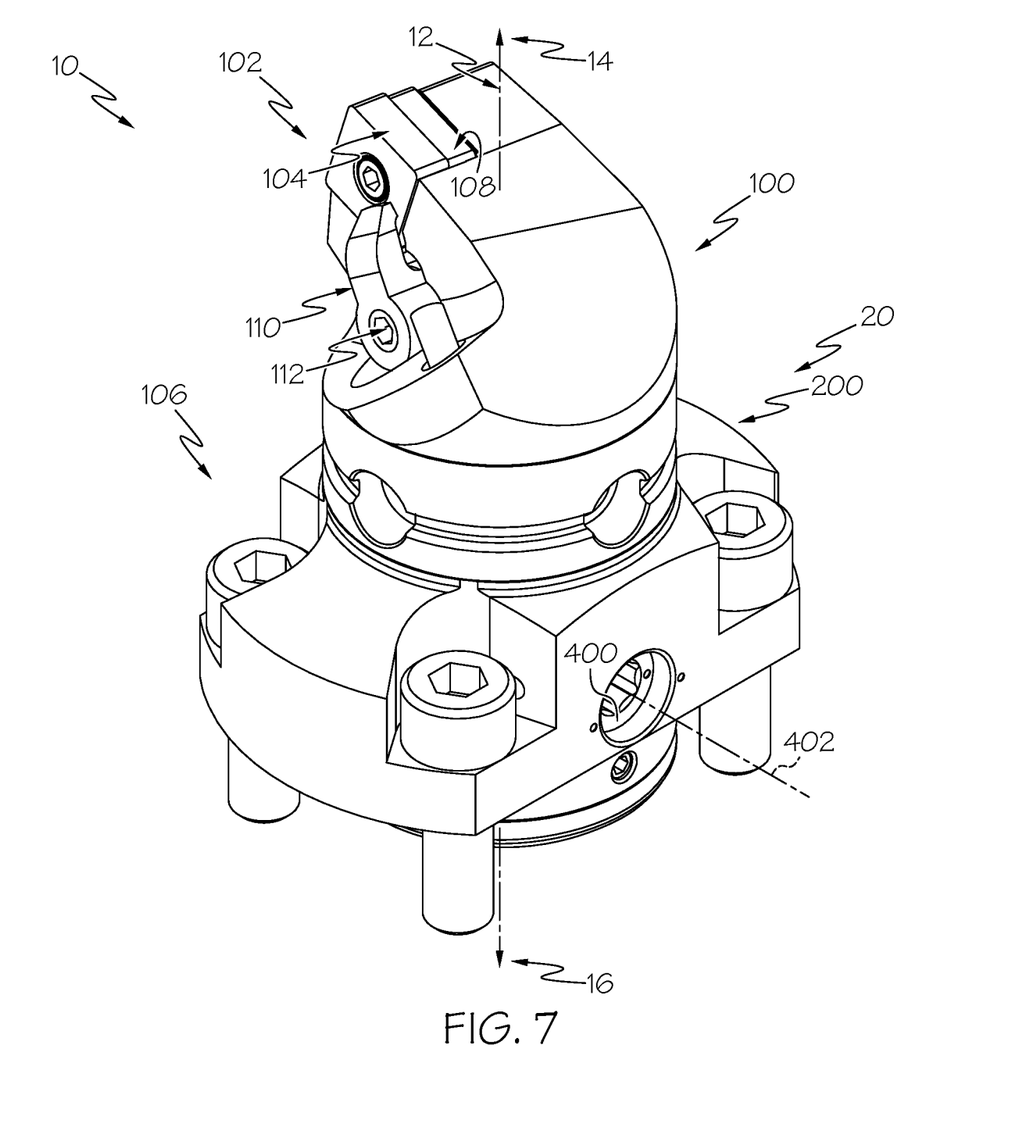
FIG. 7 is a perspective view of the toolholder assembly of FIG. 1 having a shank of the toolholder received in the clamping assembly.
Figure 8:
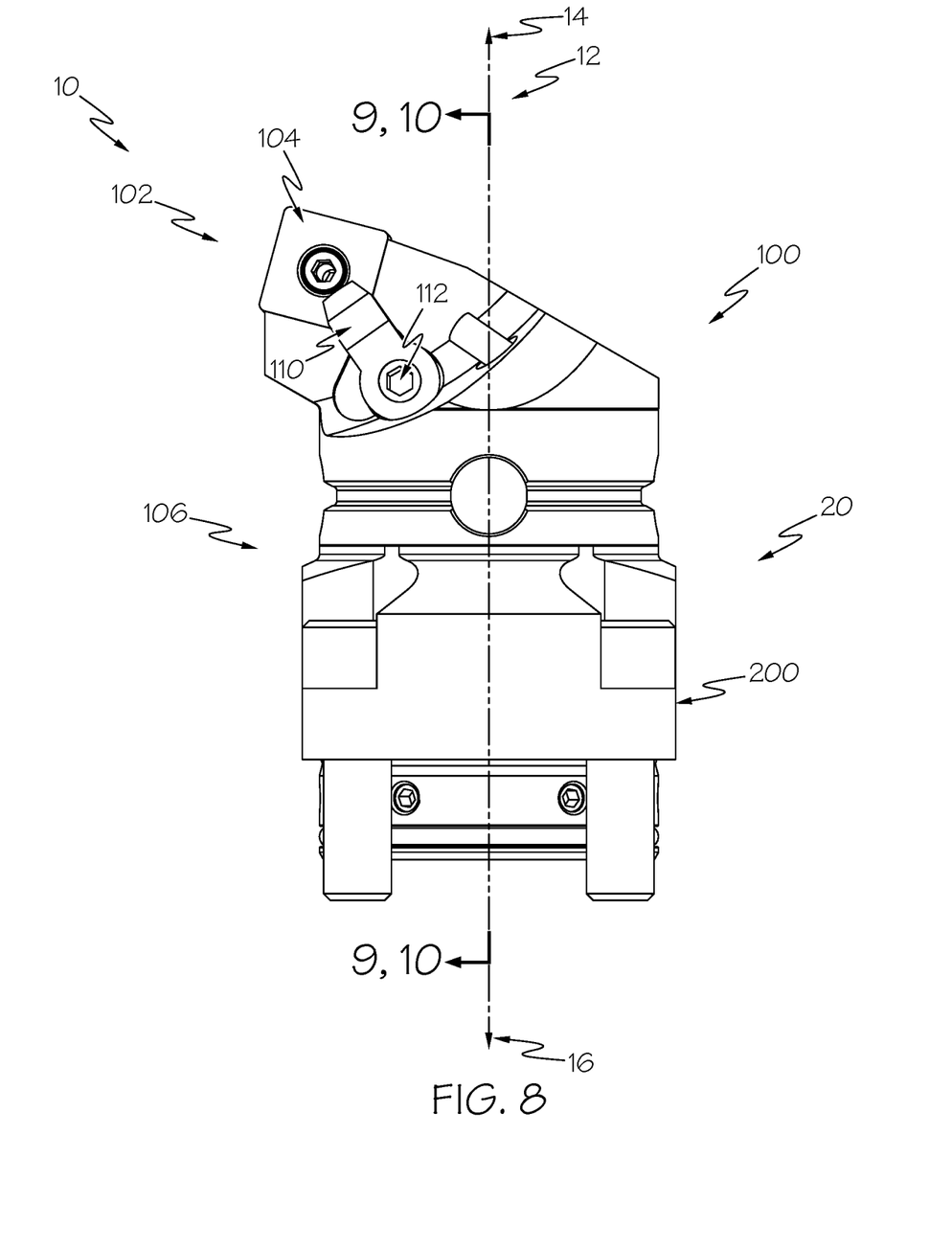
FIG. 8 is a front view of the toolholder assembly of FIG. 7.
Figure 9:
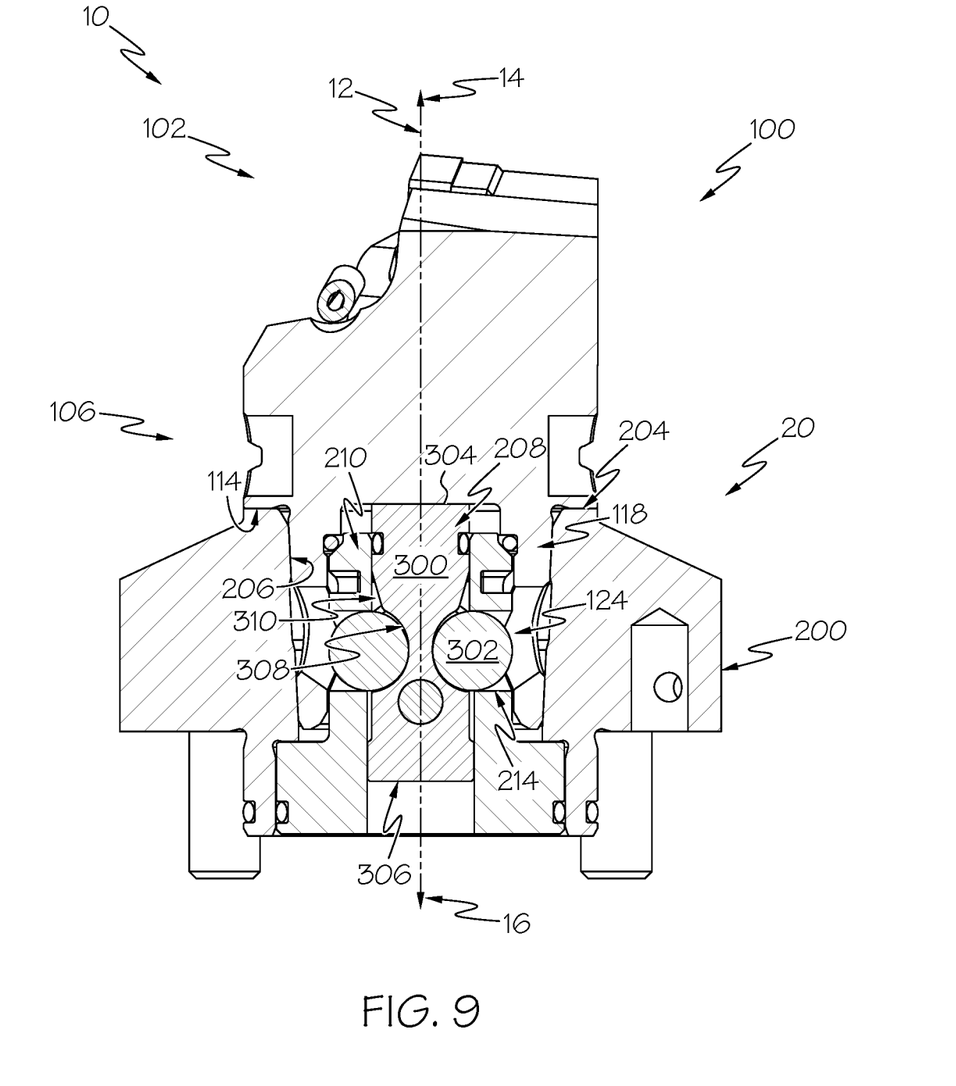
FIG. 9 is a sectional view of the toolholder assembly of FIG. 8 taken along line 9-9, in an unclamped position.
Figure 10:
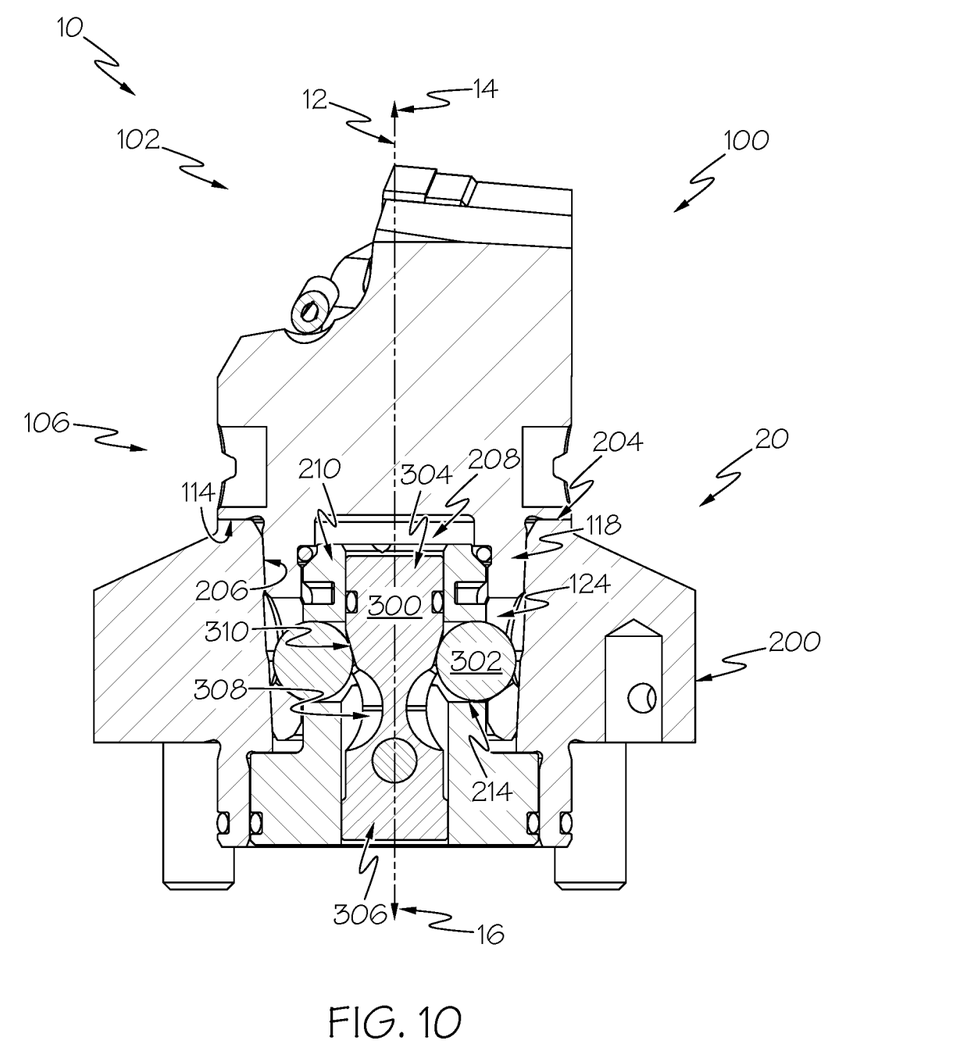
FIG. 10 is a sectional view of the toolholder assembly of FIG. 8 taken along line 10-10, in a clamped position.
Figure 11:
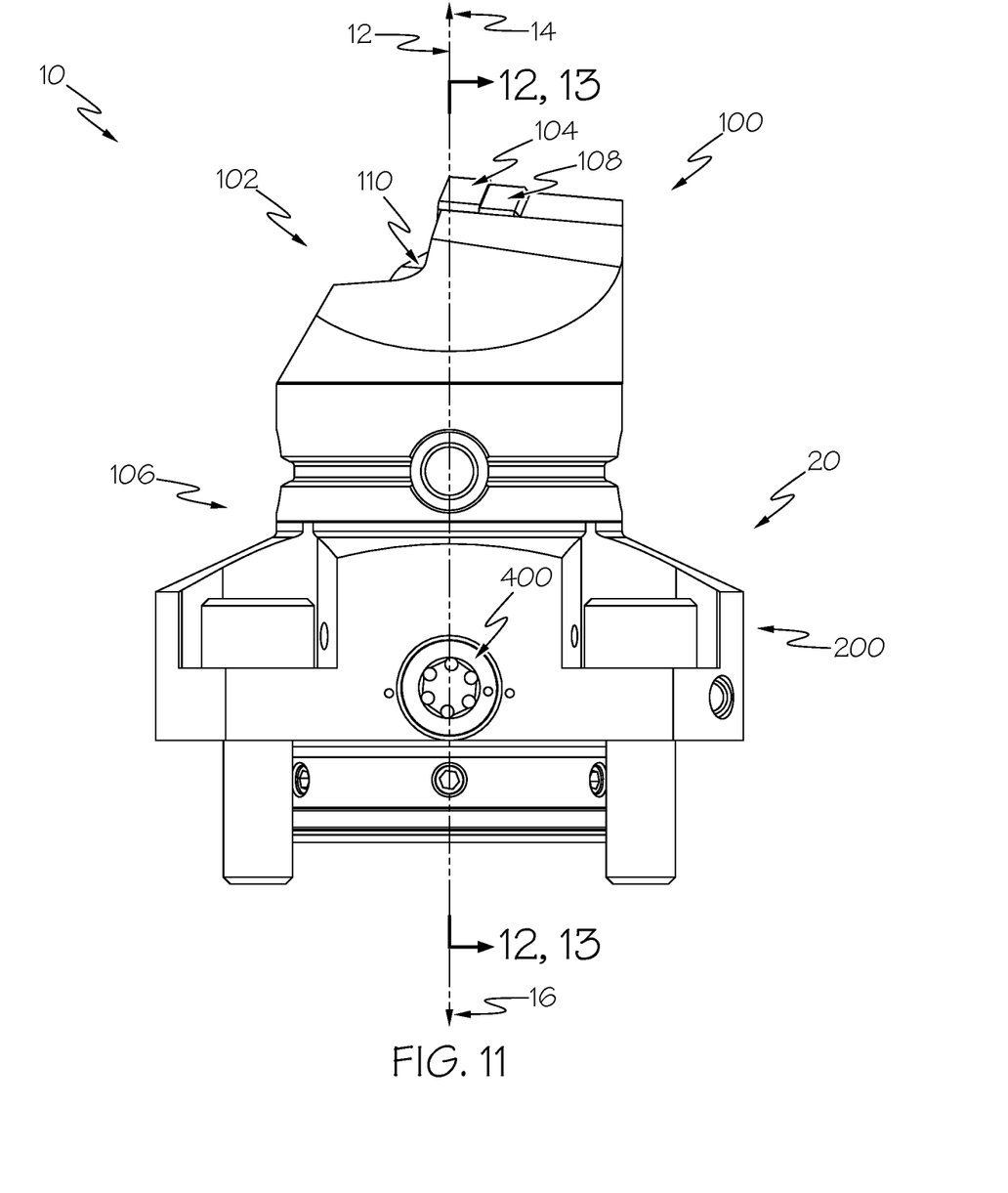
FIG. 11 is a side view of the toolholder assembly of FIG. 7.
Figure 12:
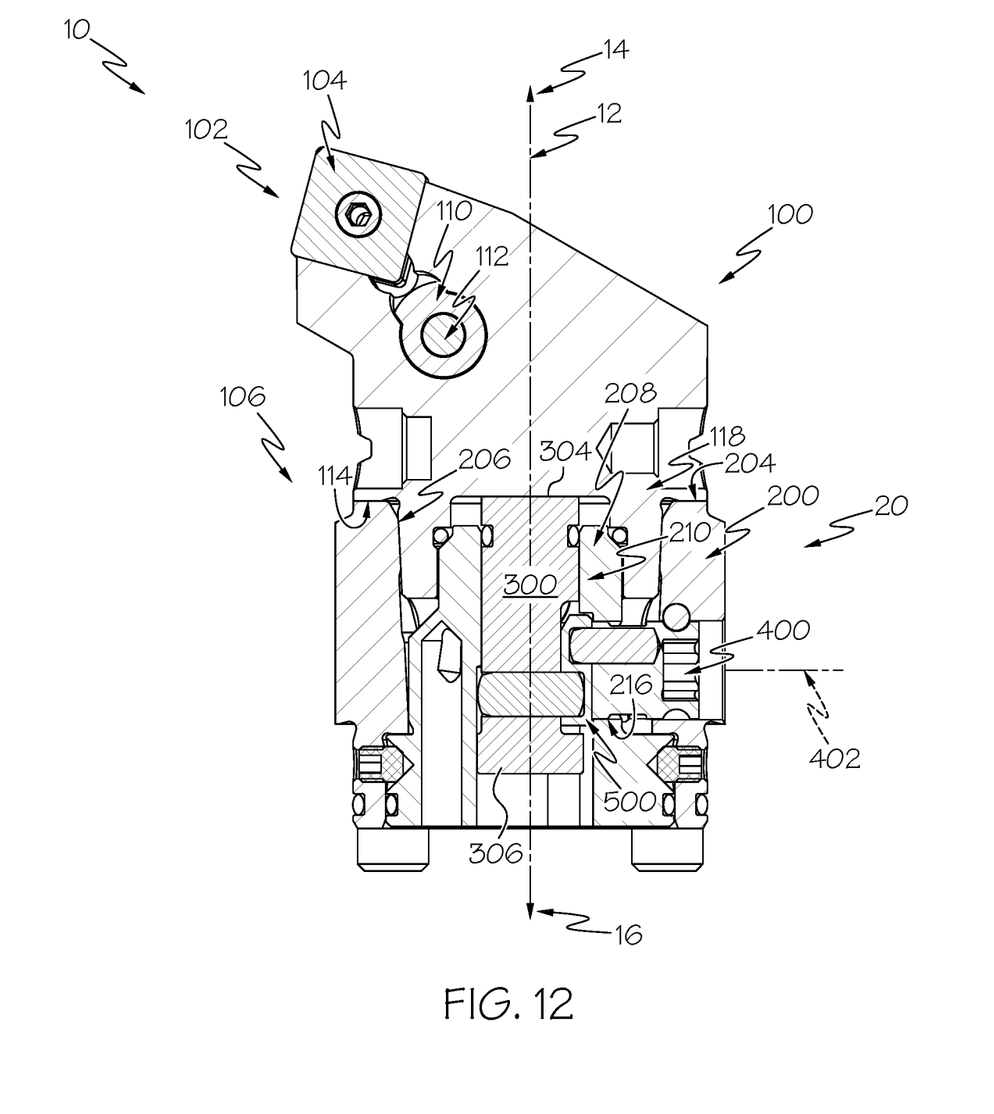
FIG. 12 is a sectional view of the toolholder assembly of FIG. 11 taken along line 12-12, in which the clamping assembly is in the unclamped position.
Figure 13:
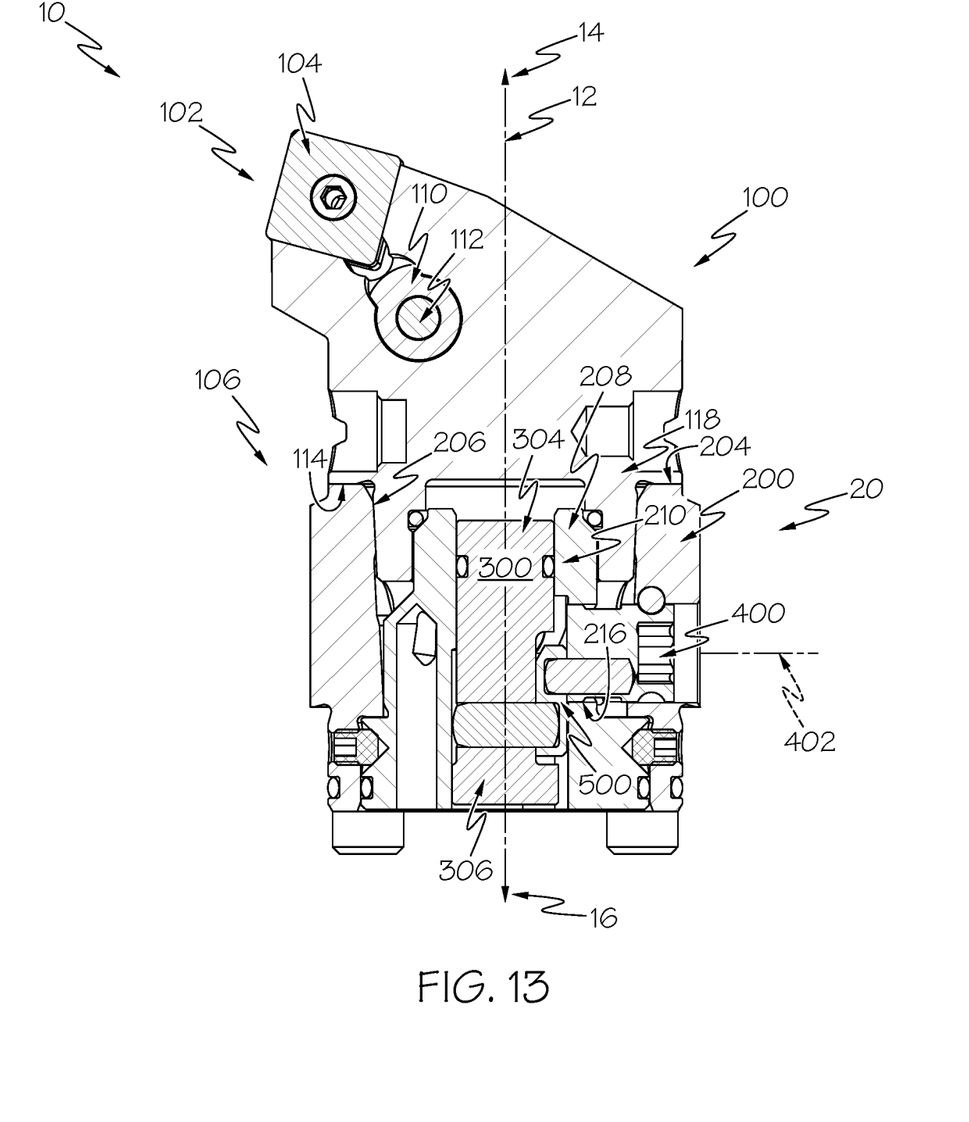
FIG. 13 is a sectional view of the toolholder assembly of FIG. 11 taken along line 13-13, in which the clamping assembly is in the clamped position.
Figure 14:
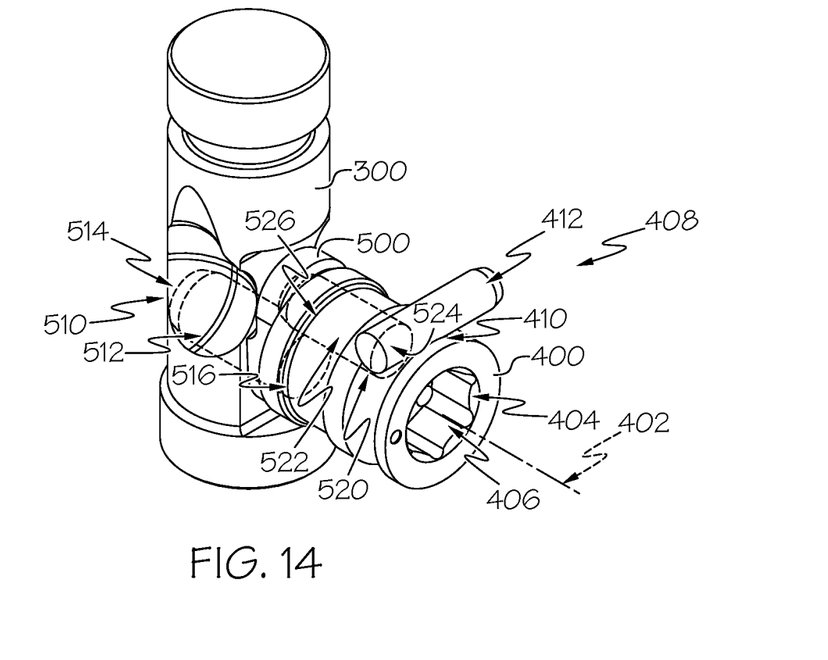
FIG. 14 is a perspective view of the lock rod, crank wheel, and linkage of FIG. 2, in which the clamping assembly is in the unclamped position.
Figure 15:
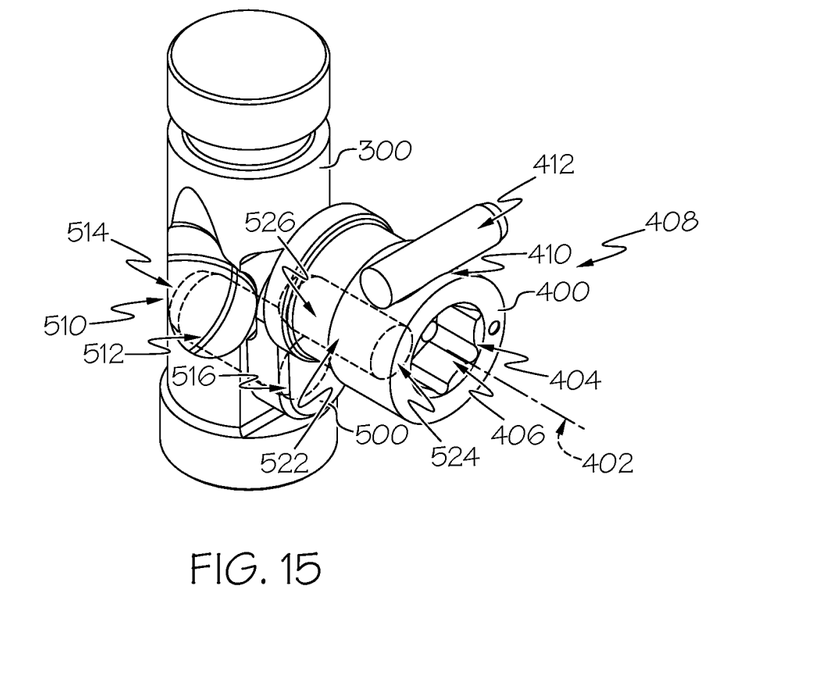
FIG. 15 is a perspective view of the lock rod, crank wheel, and linkage of FIG. 2, in which the clamping assembly is in the clamped position.

FIGS. 1 to 15 relate to a toolholder assembly 10 according to an example of the present description. FIG. 1 is a perspective view of the toolholder assembly 10. FIG. 2 is an exploded perspective view of the toolholder assembly 10 of FIG. 1. FIG. 3 is a front view of the toolholder assembly 10 of FIG. 1. FIG. 4 is a sectional view of the toolholder assembly 10 of FIG. 3 taken along line 4-4. FIG. 5 is a side view of the toolholder assembly 10 of FIG. 1. FIG. 6 is a sectional view of the toolholder assembly 10 of FIG. 5 taken along line 6-6. FIG. 7 is a perspective view of the toolholder assembly 10 of FIG. 1 having a shank of a toolholder received in a clamping assembly. FIG. 8 is a front view of the toolholder assembly 10 of FIG. 7. FIG. 9 is a sectional view of the toolholder assembly 10 of FIG. 8 taken along line 9-9, in an unclamped position. FIG. 10 is a sectional view of the toolholder assembly 10 of FIG. 8 taken along line 10-10, in a clamped position. FIG. 11 is a side view of the toolholder assembly 10 of FIG. 7. FIG. 12 is a sectional view of the toolholder assembly 10 of FIG. 11 taken along line 12-12, in which the clamping assembly is in the unclamped position. FIG. 13 is a sectional view of the toolholder assembly 10 of FIG. 11 taken along line 13-13, in which the clamping assembly is in the clamped position. FIG. 14 is a perspective view of the lock rod 300, the crank wheel 400, and the linkage 500, in which the clamping assembly 20 is in the unclamped position. FIG. 15 is a perspective view of the lock rod 300, the crank wheel 400, and the linkage 500, in which the clamping assembly 20 is in the clamped position.

As best shown in FIGS. 1, 3, 4, 5, and 6, the toolholder assembly 10 includes a clamping assembly 20 and a toolholder 100. The clamping assembly 20 and a toolholder 100 are positioned about a longitudinal axis 12. The toolholder 100 is positioned in a forward direction 14 from the clamping assembly 20 with respect to the longitudinal axis 12, and, thus, the clamping assembly 20 is positioned in a rearward direction 16 from the toolholder 100 with respect to the longitudinal axis 12. This longitudinal axis 12, forward direction 14, and rearward direction 16 will be used as a reference through the specification.

The toolholder 100 has a forward end 102 on which a cutting insert 104 or another tool is mounted and a rearward end 106 opposite the forward end 102. The cutting insert 104 is spaced from the toolholder 100 by a shim 108 and both the cutting insert 104 and the shim 108 are held to the toolholder by a clamp 110, which is secured to the toolholder by a screw 112. The toolholder 100 is typical of a toolholder used for non-rotating tools such as a lathe. However, it should be understood that the toolholder may have attached to it any one of a variety of tools that may be associate with either rotating or non-rotating applications.

The rearward end 106 of the toolholder 100 has a rearwardly facing abutment face 114 and a shank 116 with a shank wall 118 extending rearwardly from the rearwardly facing abutment face 114 and defining a shank bore 120. The shank 116 has a frustoconical shape which tapers inwardly as it extends rearwardly. The shank wall 118 has an alignment slot 122 for aligning the toolholder 100 within the clamping assembly 20, and the shank wall 118 has one or more locking apertures 124. Referring to FIG. 6, the one or more locking apertures 124 have sloped interior surfaces 126 that taper outwardly as they extend forwardly.

As best shown in FIGS. 1, 2, 3, 4, and 6, the clamping assembly 20 includes a base member 200 having an internal bore 202, a lock rod 300 within the internal bore 202 of the base member 200 and moveable between a unlocked position and a locked position, a crank wheel 400 having an axis of rotation 402, and a linkage 500 coupled to the lock rod 300 and coupled to the crank wheel 400 at a position radially offset from the axis of rotation 402 of the crank wheel 400. By this arrangement, rotation of the crank wheel 400 drives the movement of the lock rod 300 between the unlocked position and the locked position by way of the coupling of the linkage 500 between the crank wheel 400 and the lock rod 300.

In an aspect, the lock rod 300 is moveable between the locked position and the unlocked position in a non-rotational direction. As illustrated, the lock rod 300 is moveable in the forward direction 14 to an unlocked position and in the rearward direction 16 to a locked position. In an alternative, the lock rod 300 could be moveable in the forward direction 14 to an locked position and in the rearward direction 16 to an unlocked position. By these arrangements, rotation of the crank wheel 400 drives the movement of the lock rod 300 between the forward direction 14 and the rearward direction 16. In another alternative, the lock rod 300 could moveable between the locked position and the unlocked position in a non-linear direction such that the lock rod 300 moves along a curved axis.

As best shown in FIGS. 1, 4, and 6, the base member 200 includes a flange 204 for abutting with the rearwardly facing abutment face 114 of the toolholder 100. The flange 204 defines an opening to the internal bore 202 having a bore wall 206, which is sized to receive the shank 116 of the toolholder 100.

As best shown in FIGS. 2, 4, and 6, the base member 200 further includes a canister 208, which is sized to be received within the shank bore 120 of the toolholder 100. As illustrated the canister 208 is a separate component from the flange 204 of the base member 200. Alternatively, the canister 208 may be integrated with the flange 204 of the base member 200. The canister 208 includes a canister wall 210 defining a canister bore 212 sized to receive the lock rod 300 and one or more locking members 302 therein. As illustrated, the lock rod 300 moves within canister bore 212 of the canister 208, which is within the internal bore 202 of the base member 200. The canister wall 210 further defines one or more locking passageways 214 and an access bore 216. The shank wall 118 is sized to be received within a space defined between the bore wall 206 and canister 208. When the shank 116 of the toolholder 100 is aligned within the base member 200, the one or more locking apertures 124 of the toolholder 100 are aligned with the one or more locking passageways 214 of the canister wall 210 and the one or more locking members 302.

As best shown in FIGS. 2, 4, and 6, the lock rod 300 has a forward end 304 and a rearward end 306. Between the forward end 304 and the rearward end 306 of the lock rod 300 are one or more depressions 308 and one or more sloped surfaces 310 which are aligned with the one or more locking passageways 214 of the canister wall 210 when in the unlocked position. The lock rod 300 is moveable within the canister bore 212 in forward and rearward directions between an unlocked position and a locked position.

Referring to FIGS. 9 and 10, when the lock rod 300 is positioned in the rearward direction, the one or more locking members 302 positioned within the one or more locking passageways 214 of the canister 208 are urged radially outwardly by the one or more sloped surfaces 310 of the lock rod 300. Thus, the one or more locking members 302 are moved radially outward through the one or more locking passageways 214 by the one or more sloped surfaces 310 of the lock rod 300 and engage the sloped interior surfaces 126 of the one or more locking apertures 124. As the one or more locking members 302 travel radially outward through the one or more locking passageways 214, they engage the sloped interior surfaces 126 of the one or more locking apertures 124 within the shank wall 118 and the one or more locking members 302 become wedges therein and thus the toolholder 100 is clamped in position. When the toolholder 100 is clamped within the base member 200, the wedging action creates high frictional forces retaining the toolholder 100 within the base member 200.

When the lock rod 300 is moved in the forward direction to an unlocked position, the one or more locking members 302 travel radially inward through the one or more locking passageways 214 to the one or more depressions 308. Thus, the one or more locking members 302 disengage from the sloped interior surfaces 126 of the one or more locking apertures 124 within the shank wall 118 resulting in the unclamping of the toolholder 100. In this configuration, the shank 116 of the toolholder 100 may be removed from the base member 200 and a new toolholder 100 may be inserted into the internal bore 202 of the base member 200, thereby providing for quick changing of the toolholder 100.

In the illustrated example, the movement of the lock rod 300 in the rearward direction clamps the toolholder 100 within the base member 200, and movement of the lock rod 300 in the forward direction releases the toolholder from the base member 200. However, in an alternative embodiment (not shown), movement of the lock rod 300 in the forward direction could clamp the toolholder 100 within the base member 200, and movement of the lock rod 300 in the rearward direction could release the toolholder 100 from the base member 200.

One focus of the present description is on the mechanism used to move the lock rod 300 in the forward and rearward directions. While the above-described toolholder 100, base member 200, and lock rod 300 are typical arrangements for a toolholder assembly, the mechanism of the present description may be used to move a lock rod for alternative toolholder assembly arrangements other than the toolholder assembly 10 illustrated and described above.

Referring to FIGS. 12 to 15, the crank wheel 400 is rotatable about an axis of rotation 402, and the linkage 500 is coupled to the lock rod 300 and coupled to the crank wheel 400 at a position radially offset from the axis of rotation 402 of the crank wheel 400. Thus, the linkage 500 functions as a connecting rod between the rotating crank wheel 400 and the sliding lock rod 300, transforming the rotational movement of the crank wheel 400 into a reciprocating forward and rearward motion of the lock rod 300 to move the lock rod between the unlocked position and the locked position.

As best shown in FIGS. 14 to 15, to facilitate rotation, the crank wheel 400 may have a torque receiving feature 404, such as the illustrated hexagonal feature 406 for receiving a hexagonal key. To limit rotation, the crank wheel 400 may have a rotation-limiting feature 408, such as the semi-annular slot 410, as best illustrated in FIG. 2, that engages with a stop pin 412 for limiting rotation of the crank wheel 400. For example, the stop pin 412 may limit rotation from about 0 to about 300 degrees, preferably from about 0 to about 200 degrees Referring to FIGS. 12 to 15, the linkage 500 may be rotationally coupled to the lock rod 300 in any manner. In the illustrated example, the linkage 500 is rotationally coupled to the lock rod 300 by a first pin joint 510. As shown, the first pin joint 510 includes a first pin 512 rotationally coupled within a first bearing 514 within the lock rod 300 and within a second bearing 516 within the linkage 500. Alternatively, the first pin 512 may be rotationally coupled within a bearing 514, 516 within one of the linkage 500 and the lock rod 300, and the first pin 512 may be fixedly coupled to the other of the linkage 500 and the lock rod 300.

Similarly, the linkage 500 may be rotationally coupled to the crank wheel 400, at a position radially offset from the axis of rotation 402 of the crank wheel 400, in any manner. In the illustrated example, the linkage 500 is rotationally coupled to the crank wheel 400 by a second pin joint 520. As shown, the second pin joint 520 includes a second pin 522 rotationally coupled within a third bearing 524 within the crank wheel 400 and within a fourth bearing 526 within the linkage 500. Alternatively, the second pin 522 may be rotationally coupled within a bearing 524, 526 within one of the linkage 500 and the crank wheel 400, and the second pin 522 may be fixedly coupled to the other of the linkage 500 and the crank wheel 400.

Thus, the linkage 500, being rotationally coupled between the lock rod 300 and the crank wheel 400 at a position radially offset from the axis of rotation 402, moves within the clamping assembly 20 to effectuate the transforming of the rotational movement of the crank wheel 400 into a reciprocating forward and rearward motion of the lock rod 300. In the illustrated example, the first pin joint 510 and the second pin joint 520 enable the rotational coupling of the linkage 500 between the lock rod 300 and the crank wheel 400.

In the illustrated example, the second bearing 516 within the linkage 500 and the fourth bearing 526 within the linkage 500 are shown as blind holes. In an alternative, the second bearing 516 and the fourth bearing 526 may take the form of through holes within the linkage 500.

In the illustrated example, the linkage 500 is shown as a single body coupled to the lock rod 300 and coupled to the crank wheel 400. In an alternative, the linkage 500 may include multiple parts.

Although various embodiments of the disclosed clamping assembly, toolholder assembly, the method of changing a toolholder in a toolholder assembly have been shown and described, modifications may occur to those skilled in the art upon reading the specification. The present application includes such modifications and is limited only by the scope of the claims.

What is claimed is:

1. A clamping assembly comprising:
a base member having an internal bore;
a lock rod within the internal bore of the base member and moveable between an unlocked position and a locked position;
a crank wheel having an axis of rotation; and
a linkage rotationally coupled to the lock rod by a pin joint and coupled to the crank wheel at a position radially offset from the axis of rotation of the crank wheel.

2. The clamping assembly of claim 1, wherein the pin joint comprises a pin rotationally coupled within a bearing within one of the linkage and the lock rod.

3. The clamping assembly of claim 2, wherein the bearing is a blind hole.

4. The clamping assembly of claim 2, wherein the bearing is a through hole.

5. The clamping assembly of claim 2, wherein the pin is rotationally coupled within a bearing within the other of the linkage and the lock rod.

6. The clamping assembly of claim 2, wherein the pin is fixedly coupled to the other of the linkage and the lock rod.

7. The clamping assembly of claim 1, wherein the linkage is rotationally coupled to the crank wheel by a pin joint.

8. The clamping assembly of claim 7, wherein the pin joint comprises a pin rotationally coupled within a bearing within one of the linkage and the crank wheel.

9. The clamping assembly of claim 8, wherein the bearing is a blind hole.

10. The clamping assembly of claim 8, wherein the bearing is a through hole.

11. The clamping assembly of claim 8, wherein the pin is rotationally coupled within a bearing within the other of the linkage and the crank wheel.

12. The clamping assembly of claim 8, wherein the pin is fixedly coupled to the other of the linkage and the crank wheel.

13. The clamping assembly of claim 1, wherein the base member includes a canister positioned within the internal bore of the base member, wherein the lock rod is positioned within a canister bore of the canister.

14. A toolholder assembly comprising:
the clamping assembly of claim 1; and
a toolholder having a shank configured to be received within the internal bore of the base member.

15. The toolholder assembly of claim 14, wherein the toolholder comprises a cutting insert.

16. A method of changing a toolholder in the toolholder assembly of claim 14, the method comprising:
rotating the crank wheel in a first direction to unclamp a first toolholder from the clamping assembly;
removing the first toolholder from the clamping assembly;
inserting a second toolholder into the clamping assembly; and
rotating the crank wheel in a second direction to clamp the second toolholder into the clamping assembly.

17. A clamping assembly comprising:
a base member having an internal bore;
a lock rod within the internal bore of the base member and moveable between an unlocked position and a locked position;
a crank wheel having an axis of rotation; and
a linkage coupled to the lock rod and rotationally coupled to the crank wheel by a pin joint at a position radially offset from the axis of rotation of the crank wheel.

18. The clamping assembly of claim 17, wherein the pin joint comprises a pin rotationally coupled within a bearing within one of the linkage and the crank wheel.

19. The clamping assembly of claim 18, wherein the bearing is a blind hole.

20. The clamping assembly of claim 18, wherein the bearing is a through hole.

21. The clamping assembly of claim 18, wherein the pin is rotationally coupled within a bearing within the other of the linkage and the crank wheel.

22. The clamping assembly of claim 18, wherein the pin is fixedly coupled to the other of the linkage and the crank wheel.

23. The clamping assembly of claim 17, wherein the base member includes a canister positioned within the internal bore of the base member, wherein the lock rod is positioned within a canister bore of the canister.

24. A toolholder assembly comprising:
the clamping assembly of claim 17; and
a toolholder having a shank configured to be received within the internal bore of the base member.

25. The toolholder assembly of claim 24, wherein the toolholder comprises a cutting insert.

26. A method of changing a toolholder in the toolholder assembly of claim 24, the method comprising:
rotating the crank wheel in a first direction to unclamp a first toolholder from the clamping assembly;
removing the first toolholder from the clamping assembly;
inserting a second toolholder into the clamping assembly; and
rotating the crank wheel in a second direction to clamp the second toolholder into the clamping assembly.

* * * * *